(12) United States Patent
McNew et al.

(10) Patent No.: US 7,338,603 B1
(45) Date of Patent: Mar. 4, 2008

(54) PROCESS USING RARE EARTHS TO REMOVE OXYANIONS FROM AQUEOUS STREAMS

(75) Inventors: Edward Bayer McNew, Las Vegas, NV (US); Richard Donald Witham, Las Vegas, NV (US); John Leslie Burba, III, Boulder City, NV (US)

(73) Assignee: Molycorp, Inc., Mountain Pass, CA (US)

( * ) Notice: Subject to any disclaimer, the term of this patent is extended or adjusted under 35 U.S.C. 154(b) by 334 days.

(21) Appl. No.: 11/190,472

(22) Filed: Jul. 27, 2005

(51) Int. Cl.
*C02F 1/42* (2006.01)

(52) U.S. Cl. ............ 210/660; 210/683; 210/688; 210/263

(58) Field of Classification Search ........ 210/660, 210/683, 688, 263
See application file for complete search history.

(56) References Cited

U.S. PATENT DOCUMENTS

| | | | |
|---|---|---|---|
| 3,956,118 A | 5/1976 | Kleber et al. ........... 210/45 |
| 4,046,687 A | 9/1977 | Schulze ................. 210/32 |
| 4,581,229 A | 4/1986 | Petrow ................. 424/70 |
| 5,053,139 A | 10/1991 | Dodwell et al. ......... 210/688 |
| 5,603,838 A | 2/1997 | Misra et al. ........... 210/665 |
| 6,197,201 B1 | 3/2001 | Misra et al. ........... 210/721 |
| 6,350,383 B1 | 2/2002 | Douglas ............... 210/679 |
| 6,383,395 B1 | 5/2002 | Clarke et al. .......... 210/683 |
| 6,524,487 B2 | 2/2003 | Kulperger et al. ....... 210/723 |
| 6,800,204 B2 | 10/2004 | Harck et al. ........... 210/683 |
| 6,833,123 B2 | 12/2004 | Huang et al. ........... 423/55 |
| 6,855,665 B1 | 2/2005 | Blake et al. ........... 502/410 |
| 6,858,147 B2 | 2/2005 | Dukhin et al. .......... 210/644 |
| 6,863,825 B2 | 3/2005 | Witham et al. ......... 210/665 |
| 2004/0144729 A1 | 7/2004 | Witham et al. ......... 210/721 |

OTHER PUBLICATIONS

Zhang, Yu, Yang, Min, Huang, Xia, "Arsenic(V) Removal With A Ce(IV)-Doped Iron Oxide Adsorbent," *Chemosphere*, vol. 51, No. 9, Jun. 2003, pp. 945-952.

Ahmed, M. Feroze, "An Overview of Arsenic Removal Technologies in Bangladesh and India," Buet-Unu International Workshop on Technologies for Arsenic Removal from Drinking Water, May 5-7, 2001, pp. 251-269.

*Primary Examiner*—Chester T Barry
(74) *Attorney, Agent, or Firm*—Yale S. Finkle; Frank C. Turner

(57) ABSTRACT

Oxyanions of various contaminant elements, such as chromium, antimony, molybdenum, tungsten, vanadium and uranium, are removed from water and other aqueous feeds by treating the feed with (1) a sorbent comprising one or more rare earth compounds, usually mixed or supported on particulate solids having a cation exchange capacity less than 20 milliequivalents per 100 grams or (2) an aqueous solution of one or more soluble rare earth compounds.

33 Claims, No Drawings

PROCESS USING RARE EARTHS TO REMOVE OXYANIONS FROM AQUEOUS STREAMS

BACKGROUND OF INVENTION

This invention relates generally to methods and devices for removing toxic materials, such as oxyanions of heavy metals and their radioactive isotopes, from aqueous streams and is particularly concerned with methods for removing such toxic materials from groundwater, waste-water and drinking water using rare earth compounds.

Toxic metals and their radioactive isotopes quite frequently find their way into the groundwater from geochemical reactions, industrial waste discharges, including those generated by nuclear power plants, past agricultural uses of pesticides containing toxic metals and other sources. Combinations of radioactive materials and toxic metals are often found in run-off waters near mining areas. Environmental regulations often require the removal of these toxic materials to extremely low levels.

Various technologies have been used in the past to remove metals from aqueous systems. Examples of such techniques include adsorption on high surface area materials, such as alumina and activated carbon, ion exchange with anion exchange resins, co-precipitation utilizing flocculants, and electrodialysis. However, most technologies for metals removal are not generally effective for removing a plurality of these metals and/or their radioactive isotopes. Moreover, techniques that have been used in large municipal water supplies to remove heavy metals to produce drinking water are not generally practical for residential applications because of space requirements and the need to use dangerous chemicals.

Thus, there is a need for new techniques to economically and effectively remove many different types of toxic metals from vast volumes of drinking water, well water and industrial waters. In addition, there is a need for these techniques to be capable of removing a variety of radioactive materials from these aqueous streams either alone or in combination with toxic non-radioactive metals.

SUMMARY OF THE INVENTION

In accordance with the invention, it has now been found that toxic metals and/or radioactive elements, usually in the form of monovalent and/or polyvalent oxyanions, can be efficiently and effectively removed from water and other aqueous feedstocks by treating the aqueous feed containing such contaminants with a rare earth compound or a mixture of rare earth compounds. In one embodiment of the invention, the contaminated aqueous feed is contacted with a solid sorbent comprising a rare earth compound or mixture of such compounds, such as lanthanum oxide, cerium dioxide or a mixture thereof, to produce an aqueous liquid with a reduced concentration of these contaminants. Although the solid sorbent may consist essentially of a pure rare earth compound or mixture of such compounds, the rare earth or mixture of rare earths is normally supported on or mixed with particulate solids. The rare earth compounds in the sorbent react with oxyanions of the metals, radioactive isotopes or other toxic elements in the aqueous feed to form insoluble species that are immobilized by adsorption, absorption or both in the insoluble sorbent particles, thereby resulting in a substantially purified aqueous stream.

If the sorbent contains particulate solids supporting or mixed with the rare earth compound or compounds, the particulate solids usually, but not always, have a rather small ion exchange capacity for the rare earths, normally less 20 milliequivalents per 100 grams. The particulate solids can be alumina, diatomaceous earth, a porous polymeric material, a refractory oxide or a non-oxide refractory. The particulate solids can also be a clay, especially if its ion exchange capacity for the rare earths is less than 20 milliequivalents per 100 grams.

In another embodiment of the invention, the aqueous feed containing the contaminant oxyanions is treated with an aqueous solution of one or more soluble rare earth compounds instead of with a solid rare earth sorbent. The aqueous rare earth solution is injected into the aqueous feed where the soluble rare earth compounds react with the contaminant oxyanions to precipitate them from the feed and thereby produce an aqueous liquid with a reduced concentration of these contaminants.

In a preferred embodiment of the process of the invention, an aqueous liquid containing one or more oxyanions of elements selected from the group consisting of bismuth, vanadium, chromium, manganese, molybdenum, antimony, tungsten, lead, hafnium and uranium is contacted with a sorbent comprising cerium dioxide or a combination of cerium dioxide and lanthanum oxide supported on particulate alumina or diatomaceous earth. The rare earths react with the oxyanions to form insoluble compounds that sorb onto the particulate sorbent and thereby yield an aqueous effluent depleted in contaminant oxyanions.

DETAILED DESCRIPTION OF THE INVENTION

Although the process of the invention is primarily envisioned for removing various metals and/or radioactive materials, usually in the form of monovalent and/or polyvalent oxyanions of the contaminant element, from drinking water and groundwater, it will be understood that the process can be used to treat any aqueous liquid feed that contains undesirable amounts of these contaminants. Examples of such liquid feeds include, among others, well water, surface waters, such as water from rivers, lakes, ponds and wetlands, agricultural waters, wastewater from industrial processes, and geothermal fluids.

The aqueous feed that is effectively treated by the process of the invention may contain one or more of a large number of contaminant metals, metalloids, and/or radioactive isotopes in the form of oxyanions of the contaminant element. Examples of the metal or metalloid contaminants that may be found in the feed include oxyanions of elements having an atomic number of 5, 13, 14, 22 to 25, 31, 32, 40 to 42, 44, 45, 49 to 52, 72 to 75, 77, 78, 82, and 83. These elements include boron, aluminum, silicon, titanium, vanadium, chromium, manganese, gallium, germanium, zirconium, niobium, molybdenum, ruthenium, rhodium, indium, tin, antimony, tellurium, hafnium, tantalum, tungsten, rhenium, iridium, platinum, lead and bismuth. Uranium with an atomic number of 92 is an example of a radioactive contaminant that may be present in the feed. For purposes of this invention, oxyanions include any anion containing oxygen in combination with one or more other elements.

In one preferred embodiment of the process of the invention, the aqueous feed contaminated with one or more of the oxyanions discussed above is passed through an inlet into a sorption vessel at a temperature and pressure, usually ambient conditions, such that the water in the feed remains in the liquid state. If the feed is contaminated with particulate solids, it is usually treated to remove the solids before it is passed into the sorption vessel. Any liquid-solids separation technique, such as filtration, centrifuging and hydrocycloning, can be used to remove the particulate solids. Normally, the sorption vessel contains a packed bed of the sorbent through which the contaminated feed is passed downward. However, if desirable, the contaminated feed can be passed upward through an expanded or fluidized bed of the sorbent.

In the sorption vessel the aqueous feed is contacted with a solid sorbent comprising one or more rare earth compounds. Normally, it is preferred that the sorbent contain a lanthanum compound, preferably lanthanum oxide, a cerium compound, preferably cerium dioxide or cerium hydrous oxide, or a mixture of lanthanum and cerium compounds. However, the sorbent may contain compounds of the other rare earths including compounds of praseodymium, neodymium, samarium, europium, gadolinium, terbium, dysprosium, holmium, erbium, thulium, ytterbium, lutetium, yttrium and scandium. Although the oxides of these rare earths are normally preferred, other water-insoluble rare earth compounds, except rare earth silicates, can be used including rare earth hydrous oxides, rare earth carbonates, rare earth phosphates, rare earth fluorides and the like.

The solid sorbent may consist essentially of a rare earth compound or mixture of such compounds or it may comprise the rare earth compound or compounds either mixed with particulate solids or supported on a particulate solid substrate. As mentioned previously, if the rare earth compound or compounds are mixed with or supported on particulate solids, these solids will have a cation exchange capacity for the rare earth compound or compounds less than 20 milliequivalents per 100 grams. The particulate solids will also be water insoluble, have a surface area from about 5 to 1,000 m$^2$/gram, usually between about 80 and 800 m$^2$/gram, and a particle size from about 2 to about 1,200 microns, usually between about 20 and about 1,000 microns. Examples of such solids include metal oxides, such as alumina, silica and titania; non-oxide refractories, such as titanium nitride, silicon nitride and silicon carbide; diatomaceous earth; mullite; porous polymeric materials, such as macroreticular beads; porous carbon; and fibrous materials. It is normally preferred that the rare earth compound or compounds be mixed with or supported on alumina or diatomaceous earth.

Certain types of clays can also be used as the particulate solids, preferably clays having a cation exchange capacity for said rare earth compound or compounds less than 20 milliequivalents per 100 grams. Examples of such clays include chlorite, halloysite and kaolin. If the clay is used as a substrate for the rare earth compound or compounds and these compounds have a low solubility in water, there is no significant ion exchange onto the clay. Thus, the clay serves strictly as a support.

In the sorption vessel, the aqueous feed is either slurried with the water-insoluble particulate solids comprising the sorbent or passed through a fixed or expanded bed of the sorbent particles. If the sorbent comprises a rare earth compound or compounds mixed with particulate solids, the mixture normally contains between about 5.0 and 95 weight percent of the rare earth compound or compounds calculated as the oxide. Preferably, the mixture will contain between about 10 and 50 weight percent, more preferably between about 20 and 30 weight percent, of the rare earth compound or compounds calculated as the oxide.

Regardless of whether the rare earth compound or compounds are present in the sorption vessel in admixture with or supported on particulate solids, the solids in the sorption vessel will typically range in diameter between about 2 and 1,200 microns. When the rare earth compound or compounds and the particulate solids are present in the sorption vessel as a fixed bed, it is normally preferred that the particles be spherical in shape so the flow of the aqueous feed through the bed is evenly distributed. However, if desired, the particles may take other shapes including that of extrudates.

As the aqueous feed passes through the sorption vessel, oxyanions in the aqueous feed contact and react with rare earth cations, such as La$^{+3}$ and Ce$^{+4}$, on the surface of the rare earth compounds to form insoluble rare earth oxyanion compounds that remain in the sorption vessel adsorbed and/or absorbed on the rare earth compounds and particulate solids if present. Examples of such reactions are illustrated by the following equations:

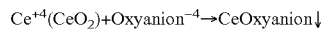

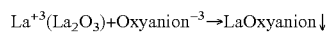

Examples of common oxyanions that may be found in the aqueous feed include $CrO_4^{-2}$, $WO_4^{-2}$, $MoO_4^{-2}$, $SbO_3^{-1}$, $MnO_4^{-2}$, $UO_4^{-2}$ and $VO_4^{-3}$. The corresponding insoluble lanthanum and cerium oxyanion compounds formed in the sorption vessel from these oxyanions include, among others, lanthanum chromate [La$_2$(CrO$_4$)$_3$], cerium chromate [Ce(CrO$_4$)$_2$], lanthanum tungstate [La$_2$(WO$_4$)$_3$], cerium tungstate [Ce(WO$_4$)$_2$], lanthanum molybdate [La$_2$(MoO$_4$)$_3$], cerium molybdate [Ce(MoO$_4$)$_2$], lanthanum antimonate [La(SbO$_3$)$_3$], cerium antimonate [Ce(SbO$_3$)$_4$], lanthanum manganate [La$_2$(MnO$_4$)$_3$], lanthanum uranate [La$_2$(UO$_4$)$_3$], cerium uranate [Ce(UO$_4$)$_2$], and lanthanum vanadate [LaVO$_4$].

In some cases the contaminated aqueous feed may contain metals in oxidation states that make their oxy-anions difficult to form so the metals can be removed from water in accordance with the invention. For example, chromium in the +3 oxidation state, which is non-carcinogenic, is difficult to remove from water and tends to convert to oxyanions of chromium in the +6 oxidation state, which are listed as a carcinogen by the EPA. Cerium and praseodymium having oxidation states of +4, Ce$^{+4}$ and Pr$^{+4}$, are very strong oxidizing agents that are capable of oxidizing chromium in the +3 oxidation state to chromium in the +6 oxidation state, which exist primarily as $CrO_4^{-2}$ and/or $Cr_2O_7^{-2}$ oxyanions in water. During such oxidation reactions, the Ce$^{+4}$ and Pr$^{+4}$ cations are reduced to Ce$^{+3}$ and Pr$^{+3}$ cations, which in turn readily react with the chromium oxyanions to form insoluble precipitates. Thus, it may be advantageous in some instances to use rare earth compounds in the sorbent that contain rare earth elements in oxidation states of +4, such as CeO$_2$ and PrO$_2$.

The sorption vessel is normally maintained at a temperature from about 1° C. to about 100° C., preferably at ambient temperature. When the sorbent is present as a fixed or packed bed in the sorption vessel, the precipitated rare earth oxyanion compounds will be sorbed by or otherwise associated with the solid particles of sorbent so that the aqueous fluid exiting the sorption vessel will contain essentially no solids and very small amounts of oxyanions. If the sorbent is slurried with the aqueous feed in the sorption vessel, the effluent from the vessel is normally treated to separate the particulate sorbent particles, including the insoluble rare earth oxyanion compounds formed in the vessel, from the oxyanion depleted liquid. Although the separation can be carried out in any type of device capable of removing particulates from liquids, a filtration system is typically employed.

In a preferred embodiment of the process of the invention, a purifying device containing a cartridge, filter, or media column as the sorption vessel is used to treat residential drinking water containing contaminant oxyanions. The treating device can be a free standing container with a filtering device containing the rare earth sorbent or a cartridge type device designed to fit under a sink. These devices are situated so that the water entering the home or business location passes through the filter or cartridge before it enters the sink faucet. The filter and cartridge devices are quite simple and comprise an inlet attached to the source of the drinking water, a filter or cartridge containing the rare earth sorbent, usually in the form of a fixed bed, and an outlet in communication with the sink faucet to direct the oxyanion-depleted drinking water exiting the cartridge or filter into the faucet. Alternatively, a cartridge or filter type device can be designed to fit onto the faucet so that water exiting the faucet passes through the cartridge or filter device before it is consumed.

In the filter or cartridge, one or more oxyanions of contaminant metals or elements react with rare earth cations in the sorbent and the resultant rare earth oxyanion compounds are sorbed onto the fixed bed solids. After the fixed bed in one of the cartridge or filter devices becomes saturated with rare earth oxyanion compounds, the cartridge or filter is replaced with a new cartridge or filter of the same or similar design. The spent cartridge or filter is then disposed of in a legally approved manner.

As mentioned previously, in an alternative embodiment of the invention, the contaminated aqueous feed is treated with a solution of one or more water-soluble rare earth compounds instead of a solid sorbent comprising rare earth compounds. In this embodiment of the invention, the solution of rare earth compounds is injected into the aqueous feed such that the rare earth compounds react with the contaminant oxyanions to precipitate them in the form of insoluble rare earth oxyanion compounds. Enough of the rare earth compounds is used so that the oxyanions in the aqueous feed are precipitated in a reasonable time period. Normally, the concentration of rare earth compounds in the solution added to the aqueous feed is similar to the concentration of oxyanions in the aqueous feed. Examples of water soluble rare earths that can be used include rare earth chlorides, rare earth nitrates, rare earth ammonium nitrates and rare earth sulfates, preferably lanthanum and cerium chlorides, nitrates, ammonium nitrates and sulfates.

The nature and objects of the invention are further illustrated by the following examples, which are provided for illustrative purposes only and not to limit the invention as defined by the claims. The examples show that various elements in the form of oxyanions can be removed from water using cerium dioxide, lanthanum oxide and mixtures thereof.

EXAMPLES 1-3

A test solution containing 1.0 ppmw chromium calculated as Cr was prepared by dissolving reagent grade potassium dichromate in distilled water. This solution contained $Cr^{+6}$ in the form of oxyanions and no other metal oxyanions. A mixture of 0.5 gram of lanthanum oxide ($La_2O_3$) and 0.5 gram of cerium dioxide ($CeO_2$) was slurried with 100 milliliters of the test solution in a glass container. The resultant slurries were agitated with a Teflon coated magnetic stir bar for 15 minutes. After agitation the water was separated from the solids by filtration through Whatman #41 filter paper and analyzed for chromium using an inductively coupled plasma atomic emission spectrometer. This procedure was repeated twice, but instead of slurrying a mixture of lanthanum oxide and cerium dioxide with the 100 milliliters of test solution, 1.0 gram of each was used. The results of these three tests are set forth below in Table 1.

TABLE 1

| Example Number | Oxyanion in Water Before Test element | (ppmw) | Slurried Material | Oxyanion in Water After Test (ppmw) | Oxyanion Removed (percent) |
|---|---|---|---|---|---|
| 1 | Cr | 1.0 | 0.5 gm $La_2O_3$ 0.5 gm $CeO_2$ | ≦0.013 | ≧98.7 |
| 2 | Cr | 1.0 | 1.0 gm $CeO_2$ | ≦0.001 | ≧99.9 |
| 3 | Cr | 1.0 | 1.0 gm $La_2O_3$ | ≦0.015 | ≧98.5 |
| 4 | Sb | 1.0 | 0.5 gm $La_2O_3$ 0.5 gm $CeO_2$ | ≦0.016 | ≧98.4 |
| 5 | Sb | 1.0 | 1.0 gm $CeO_2$ | ≦0.016 | ≧98.4 |
| 6 | Sb | 1.0 | 1.0 gm $La_2O_3$ | ≦0.100 | ≧90.0 |
| 7 | Mo | 1.0 | 0.5 gm $La_2O_3$ 0.5 gm $CeO_2$ | ≦0.007 | ≧99.3 |
| 8 | Mo | 1.0 | 1.0 gm $CeO_2$ | ≦0.001 | ≧99.9 |
| 9 | Mo | 1.0 | 1.0 gm $La_2O_3$ | ≦0.009 | ≧99.1 |
| 10 | V | 1.0 | 1.0 gm $La_2O_3$ 1.0 gm $CeO_2$ | ≦0.004 | ≧99.6 |
| 11 | V | 1.0 | 1.0 gm $CeO_2$ | 0.120 | 88.0 |
| 12 | V | 1.0 | 1.0 gm $La_2O_3$ | ≦0.007 | ≧99.3 |
| 13 | U | 2.0 | 0.5 gm $La_2O_3$ 0.5 gm $CeO_2$ | ≦0.017 | ≧98.3 |
| 14 | U | 2.0 | 1.0 gm $CeO_2$ | 0.500 | 75.0 |
| 15 | U | 2.0 | 1.0 gm $La_2O_3$ | ≦0.050 | ≧95.0 |
| 16 | W | 1.0 | 0.5 gm $La_2O_3$ 0.5 gm $CeO_2$ | ≦0.050 | ≧95.0 |
| 17 | W | 1.0 | 1.0 gm $CeO_2$ | ≦0.050 | ≧95.0 |
| 18 | W | 1.0 | 1.0 gm $La_2O_3$ | ≦0.050 | ≧95.0 |

As can be seen the lanthanum oxide, the cerium dioxide and the equal mixture of each were effective in removing over 98 percent of the chromium from the test solution.

EXAMPLES 4-6

The procedures of Examples 1-3 were repeated except that a test solution containing 1.0 ppmw antimony calculated as Sb was used instead of the chromium test solution. The antimony test solution was prepared by diluting with distilled water a certified standard solution containing 100 ppmw antimony along with 100 ppmw each of As, Be, Ca, Cd, Co, Cr, Fe, Li, Mg, Mn, Mo, Ni, Pb, Se, Sr, Ti, Tl, V, and Zn. The results of these tests are also set forth in Table 1 and show that the two rare earth compounds alone or in admixture were effective in removing 90 percent or more of the antimony from the test solution.

EXAMPLES 7-9

The procedures of Examples 1-3 were repeated except that a test solution containing 1.0 ppmw molybdenum calculated as Mo was used instead of the chromium test solution. The molybdenum test solution was prepared by diluting with distilled water a certified standard solution containing 100 ppmw molybdenum along with 100 ppmw each of As, Be, Ca, Cd, Co, Cr, Fe, Li, Mg, Mn, Ni, Pb, Sb, Se, Sr, Ti, Tl, V, and Zn. The results of these tests are set forth in Table 1 and show that the lanthanum oxide, the cerium dioxide and the equal weight mixture of each were effective in removing over 99 percent of the molybdenum from the test solution.

EXAMPLES 10-12

The procedures of Examples 1-3 were repeated except that a test solution containing 1.0 ppmw vanadium calculated as V was used instead of the chromium test solution. The vanadium test solution was prepared by diluting with distilled water a certified standard solution containing 100 ppmw vanadium along with 100 ppmw each of As, Be, Ca, Cd, Co, Cr, Fe, Li, Mg, Mn, Mo, Ni, Pb, Sb, Se, Sr, Ti, Tl, and Zn. The results of these tests are set forth in Table 1 and show that the lanthanum oxide and the equal weight mixture of lanthanum oxide and cerium dioxide were effective in removing over 98 percent of the vanadium from the test solution, while the cerium dioxide removed about 88 percent of the vanadium.

EXAMPLES 13-15

The procedures of Examples 1-3 were repeated except that a test solution containing 2.0 ppmw uranium calculated as U was used instead of the chromium test solution. The uranium test solution was prepared by diluting a certified standard solution containing 1,000 ppmw uranium with distilled water. This solution contained no other metals. The results of these tests are set forth in Table 1 and show that, like in Examples 10-12, the lanthanum oxide and the equal weight mixture of lanthanum oxide and cerium dioxide were effective in removing the vast majority of the uranium from the test solution. However, like in those examples, the cerium dioxide was not as effective removing about 75 percent of the uranium.

EXAMPLES 16-18

The procedures of Examples 1-3 were repeated except that a test solution containing 1.0 ppmw tungsten calculated as W was used instead of the chromium test solution. The tungsten test solution was prepared by diluting a certified standard solution containing 1,000 ppmw tungsten with distilled water. The solution contained no other metals. The results of these tests are set forth in Table 1 and show that the lanthanum oxide, cerium dioxide, and the equal weight mixture of lanthanum oxide and cerium dioxide were equally effective in removing 95 percent or more of the tungsten from the test solution.

Although this invention has been described by reference to several embodiments of the invention, it is evident that many alterations, modifications and variations will be apparent to those skilled in the art in light of the foregoing description. Accordingly, it is intended to embrace within the invention all such alternatives, modifications and variations that fall within the spirit and scope of the appended claims.

We claim:

1. A process for removing oxyanions of an element having an atomic number selected from the group consisting of 5, 13, 14, 22 to 25, 31, 32, 40 to 42, 44, 45, 49 to 52, 72 to 75, 77, 78, 82, 83 and 92 from an aqueous feed containing one or more of said oxyanions, which process comprises contacting said aqueous feed with a sorbent comprising one or more rare earth compounds to remove one or more of said oxyanions from said feed and thereby produce an aqueous fluid having a reduced concentration of said oxyanions as compared to said feed, wherein said rare earth compound or compounds are not supported on particulate solids having a cation exchange capacity for said rare earth compound or compounds greater than 20 milliequivalents per 100 grams.

2. The process defined by claim 1 wherein said sorbent comprises a lanthanum compound.

3. The process defined by claim 1 wherein said sorbent comprises a cerium compound.

4. The process defined by claim 1 wherein said sorbent comprises a mixture of rare earth compounds.

5. The process defined by claim 4 wherein said mixture of rare earth compounds comprises a lanthanum compound and a cerium compound.

6. The process defined by claim 4 wherein said mixture of rare earth compounds comprises a praseodymium compound and a cerium compound.

7. The process defined by claim 1 wherein said feed contains one or more oxyanions of elements selected from the group consisting of bismuth, vanadium, chromium, manganese, molybdenum, antimony, tungsten, lead, hafnium and uranium.

8. The process defined by claim 7 wherein said feed contains one or more oxyanions selected from the group consisting of $CrO_4^{-2}$, $Cr_2O_7^{-2}$, $WO_4^{-2}$, $MO_4^{-2}$, $SbO_3^{-1}$, $MnO^{4-2}$ $UO_4^{-2}$, and $VO_4^{-3}$.

9. The process defined by claim 3 wherein said cerium compound comprises cerium dioxide.

10. The process defined by claim 1 wherein said sorbent consist essentially of a rare earth compound or a mixture of rare earth compounds.

11. The process defined by claim 7 wherein said sorbent comprises one or more rare earth compounds supported on particulate solids having a cation exchange capacity less than 20 milliequivalents per 100 grams.

12. The process defined by claim 7 wherein said sorbent comprises one or more rare earth compound mixed with particulate solids having a cation exchange capacity less than 20 milliequivalents per 100 grams.

13. The process defined by claim 11 wherein said particulate solids having a cation exchange capacity less than 20 milliequivalents per 100 grams are selected from the group consisting of alumina, diatomaceous earth, porous polymeric materials, refractory oxides and non-oxide refractories.

14. The process defined by claim 12 wherein said particulate solids having a cation exchange capacity less than 20 milliequivalents per 100 grams are selected from the group consisting of alumina, diatomaceous earth, porous polymeric materials, refractory oxides and non-oxide refractories.

15. The process defined by claim 11 wherein said particulate solids have essentially no cation exchange capacity.

16. The process defined by claim 12 wherein said particulate solids have essentially no cation exchange capacity.

17. The process defined by claim 7 wherein said sorbent comprises cerium dioxide mixed or supported on alumina or diatomaceous earth.

18. The process defined by claim 7 wherein said sorbent comprises lanthanum oxide mixed or supported on alumina or diatomaceous earth.

19. The process defined by claim 7 wherein said aqueous feed is selected from the group consisting of groundwater, surface water, drinking water, industrial wastewater, agricultural water, lake water, river water, wetlands water and geothermal water.

20. The process defined by claim 2 wherein said feed contains one or more oxyanions of elements selected from the group consisting of chromium, molybdenum, vanadium, uranium, tungsten and antimony.

21. The process defined by claim 3 wherein said feed contains one or more oxyanions selected from the group consisting of chromium, molybdenum, vanadium, uranium, tungsten and antimony.

22. The process defined by claim 7 wherein said feed contains one or more oxyanions of elements selected from the group consisting of bismuth, vanadium, chromium, manganese, molybdenum, tungsten, lead, hafnium and uranium.

23. A process for removing oxyanions of an element selected from the group consisting of bismuth, manganese, molybdenum, antimony, lead, uranium, and hafnium from an aqueous feed containing one or more of said oxyanions, which process comprises contacting said aqueous feed with a sorbent comprising one or more rare earth compounds to remove one or more of said oxyanions from said feed and thereby produce an aqueous fluid having a reduced concentration of said oxyanions as compared to said feed.

24. The process defined by claim 23 wherein said aqueous feed contains one or more oxyanions of elements selected from the group consisting of molybdenum, uranium and antimony and said sorbent comprises cerium dioxide.

25. The process defined by claim 23 wherein said aqueous feed contains one or more oxyanions of elements selected from the group consisting of molybdenum, uranium and antimony and said sorbent comprises lanthanum oxide.

26. The process defined by claim 23 wherein said aqueous feed contains one or more oxyanions of elements selected from the group consisting of bismuth, manganese, molybdenum, antimony, uranium, and hafnium.

27. The process defined by claim 26 wherein said aqueous feed contains one or more oxyanions of elements selected from the group consisting of manganese, molybdenum, uranium and hafnium.

28. A process for removing oxyanions of an element having an atomic number selected from the group consisting of 5, 13, 14, 22 to 25, 31, 32, 40 to 42, 44, 45, 49 to 52, 72 to 75, 77, 78, 82, 83 and 92 from an aqueous feed containing one or more of said oxyanions, which process comprises contacting said aqueous feed with an aqueous solution of one or more soluble rare earth compounds to precipitate one or more of said oxyanions from said feed and thereby produce an aqueous fluid having a reduced concentration of said oxyanions as compared to said feed.

29. The process defined by claim 28 wherein said aqueous solution contains one or more rare earth compounds selected from the group consisting of rare earth chlorides, rare earth nitrates, rare earth ammonium nitrates and rare earth sulfates.

30. The process defined by claim 29 wherein said rare earth compounds or compounds are selected from the group consisting of cerium compounds and lanthanum compounds.

31. The process defined by claim 28 wherein said feed contains one or more oxyanions of elements selected from the group consisting bismuth, vanadium, chromium, manganese, molybdenum, antimony, tungsten, lead, hafnium and uranium.

32. A process for removing oxyanions of an element having an atomic number selected from the group consisting of 5, 13, 14, 22 to 25, 31, 32, 40 to 42, 44, 45, 49 to 52, 72 to 75, 77, 78, 82, 83 and 92 from an aqueous feed containing one or more of said oxyanions, which process comprises contacting said aqueous feed with a sorbent comprising one or more rare earth compounds to remove one or more of said oxyanions from said feed and thereby produce an aqueous fluid having a reduced concentration of said oxyanions as compared to said feed.

33. A device for removing oxyanions from drinking water comprising:
  (a) an inlet communicating with a source of said drinking water;
  (b) a vessel containing a sorbent comprising one or more rare earth compounds supported on or mixed with particulate solids having a cation exchange capacity less than 20 milliequivalents per 100 grams, wherein said vessel has an entry portion and an exit portion and said entry portion communicates with said inlet; and
  (c) an outlet communicating with said exit portion of said vessel.

* * * * *